Figure 1:
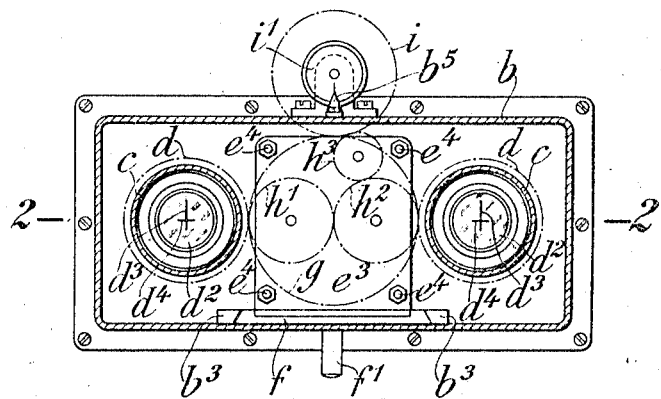

C. PULFRICH.
STEREOSCOPIC OCULAR.
APPLICATION FILED JAN. 29, 1914.

1,096,642.

Patented May 12, 1914.

Witnesses:
Paul Krüger
Fritz Sander

Inventor:
Carl Pulfrich

UNITED STATES PATENT OFFICE.

CARL PULFRICH, OF JENA, GERMANY, ASSIGNOR TO THE FIRM OF CARL ZEISS, OF JENA, GERMANY.

STEREOSCOPIC OCULAR.

1,096,642.   Specification of Letters Patent.   Patented May 12, 1914.

Application filed January 29, 1914.   Serial No. 815,249.

*To all whom it may concern:*

Be it known that I, CARL PULFRICH, a citizen of the German Empire, residing at Jena, Germany, have invented a new and useful Stereoscopic Ocular, of which the following is a specification.

The present invention relates to astronomical or terrestrial double oculars, in which for stereoscopic measuring two marks, each of which is provided with a distinguished point, are each disposed in an image-plane of the two single oculars in such a manner that a stereoscopic mark is presented to the observer. Up to the present only such stereoscopic marks have been formed, as have an invariable inclination to the spatial image of the object to be measured. In such forms of marks as are elongated in the vertical direction and have the distinguished point at their bottom end, which forms are used more particularly for stereoscopic measuring, on measuring at overhanging parts of the spatial image of the object, that part of the mark, which is adjacent to its distinguished point, entered into the interior of the said spatial image, whereby observation was rendered difficult. In order to be able to avoid this, according to the invention the inclination of the mark is made variable, each mark being so disposed in the image-plane containing it as to be rotatable about its distinguished point relatively to that straight line, which corresponds in the said image-plane to the plane containing the two axes of inspection. When the axes of inspection lie, for example, in a horizontal plane, the said straight line is horizontal. The centers of rotation of the two marks correspond to that point of the stereoscopic mark, which, on a measurement being made, is to be brought into coincidence successively with the points of the spatial image of the object, and it will be found to be expedient to leave their relative position unaltered and to effect the relative displacement of the stereoscopic mark and of the spatial image of the object in the depth-direction by a relative adjustment of the half-images of the object presented to the observer.

The inclination of the mark may be varied in a particularly simple manner within the planes, which are perpendicular to the direction of inspection of the double ocular, and within its plane of symmetry—by which is meant that plane, which is parallel to the direction of inspection and all points of which are equidistant from the axes of inspection of the two oculars. While in the former case the two marks are to be rotated in such a manner that they both always deviate each by the same amount and both in the same sense from that position, in which they form a stereoscopic mark lying in the plane of symmetry, in the latter case they are to be so rotated in opposite directions that they both always deviate each by the same amount from that position in which they form a stereoscopic mark, which lies in a plane perpendicular to the direction of inspection of the double ocular. When, owing to the character of the object-surface to be measured, more particularly a variation of inclination of the stereoscopic mark within the planes, which are perpendicular to the direction of inspection of the double ocular, is desirable, the marks may be disengageably coupled for rotating jointly by equal amounts and both in the same sense, when, on the other hand, principally a variation of inclination of the stereoscopic mark within the plane of symmetry of the double ocular is to be obtainable, the marks may be disengageably coupled for rotating jointly by equal amounts but in opposite directions.

Figure 2:
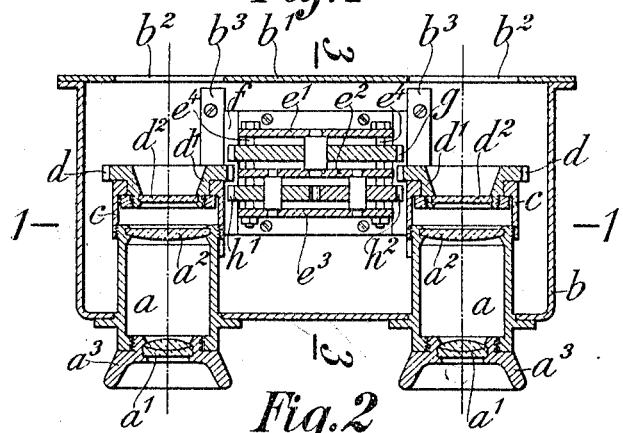
Figure 3:
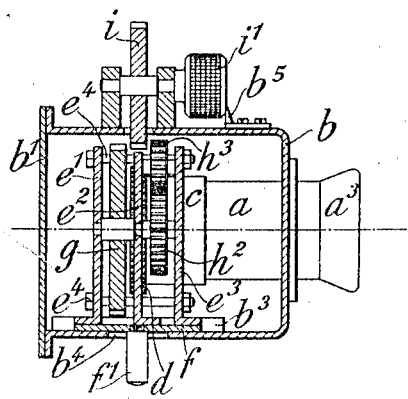

In the annexed drawing: Figures 1 to 3 show a constructional example of the invention, Fig. 1 being a cross-section through the double ocular, Fig. 2 a longitudinal section containing the axes of the two single oculars, and Fig. 3 a section along the plane of symmetry of the double ocular.

The double ocular comprises two Ramsden oculars $a$, the eye-lenses of which are marked $a^1$ and the field-lenses $a^2$. The oculars are fixed in a common casing $b$ in such a manner that substantially only their shell-pieces $a^3$ lie outside the said casing. The casing is closed at its front side by a cover $b^1$, which is furnished opposite each ocular with a circular opening $b^2$. The oculars are each provided at their front side with a socket $c$, on which a plate-carrier $d^1$ fitted with spur gearing $d$ is rotatably journaled. The gearings $d$ have the same number of teeth in the case of each ocular. Each plate-carrier is fitted with a glass plate $d^2$, the rear limiting surface of which belongs to the image plane of the ocular and bears a mark $d^3$ in the shape of a stroke, which intersects the axis of the ocular, the point of intersection being indicated by a short cross-stroke $d^4$. The said marks $d^3$ as well as the short cross-strokes $d^4$ of the two oculars $a$ are so constituted that they form jointly a stereoscopic mark, which appears to the observer as an elongated cross, the point of intersection of the two limbs of which is to be brought, when measuring, into coincidence with the separate points of the spatial image of the object. In the casing $b$ there is fitted a gearing-bearing, consisting of three plates $e^1$, $e^2$ and $e^3$, which are connected together by means of screws $e^4$ and are fixed to a common bed-plate $f$. The bed-plate is guided between two gibs $b^3$, which are screwed to the bottom of the casing, in the direction of the ocular axes and can be displaced by means of a knob $f^1$, which projects through a slot $b^4$ of the casing to the outside, the ends of the said slot acting as stops. Between each of two plates gearing is journaled, consisting between the plates $e^1$ and $e^2$ of a wheel $g$ and between the plates $e^2$ and $e^3$ of three wheels $h^1$, $h^2$ and $h^3$, which mesh with one another and of which $h^1$ and $h^2$ have the same number of teeth. The axes of all the wheels of both sets of gearing are parallel to the ocular axes. By displacing the gearing-bearing, either one set of gearing or the other may be caused to engage the gearings $d$ of the plate-carriers $d^1$ and with a wheel $i$, which has the same number of teeth as the gearings $d$ and is journaled opposite the latter on the casing $b$. The wheel $i$ can be actuated by means of a milled head $i^1$ and can effect, according as the gearing $g$ or the gearing $h^1$, $h^2$, $h^3$ is in mesh, a rotation of the gearings $d$ and in consequence of the marks $d^3$, in which these latter agree with one another as to their direction of rotation, or such a rotation, in which they are opposed to one another as to their direction of rotation. As the wheel $i$ has the same number of teeth as the gearings $d$, one revolution of $i$ corresponds to one revolution of the gearings and consequently of the marks. The gearings may only then be put into or out of mesh, when the two marks $d^3$ are perpendicular to the plane, in which lie the two ocular axes. This relative position of the two marks is shown on the face of the milled head $i^1$ by an index $b^5$, which is fixed to the casing $b$. The drawing shows this position of the marks $d^3$, and the intermediate position of the gearing-bearing.

I claim:

1. In a stereoscopic ocular two single oculars, two marks having each a distinguished point, each of the said two oculars containing one such mark in an image-plane, and means for rotating each of the said marks in the image-plane containing it about its distinguished point relatively to that straight line, which corresponds in the said image-plane to the plane containing the two axes of inspection.

2. In a stereoscopic ocular two single oculars, two marks having each a distinguished point, each of the said two oculars containing one such mark in an image-plane, and means for disengageably coupling the said marks for their joint rotation by equal amounts, each in the image-plane containing it and about its distinguished point, relatively to that straight line, which corresponds in the said image-plane to the plane containing the two axes of inspection.

3. In a stereoscopic ocular two single oculars, two marks having each a distinguished point, each of the said two oculars containing one such mark in an image-plane, and means for disengageably coupling the said marks for their joint rotation by equal amounts and both in the same sense, each in the image-plane containing it and about its distinguished point, relatively to that straight line, which corresponds in the said image-plane to the plane containing the two axes of inspection.

CARL PULFRICH.

Witnesses:
PAUL KRÜGER,
FRITZ LANDER.